(12) United States Patent
Jonsson

(10) Patent No.: US 10,862,821 B1
(45) Date of Patent: Dec. 8, 2020

(54) MANAGING PROCESSOR LOAD IN A MULTI-TENANT ENVIRONMENT

(71) Applicant: Amazon Technologies, Inc., Reno, NV (US)

(72) Inventor: Jan Henrik Jonsson, Long Beach, CA (US)

(73) Assignee: Amazon Technologies, Inc., Seattle, WA (US)

(*) Notice: Subject to any disclaimer, the term of this patent is extended or adjusted under 35 U.S.C. 154(b) by 413 days.

(21) Appl. No.: 15/184,175

(22) Filed: Jun. 16, 2016

(51) Int. Cl.
| | | |
|---|---|---|
| *H04L 12/911* | (2013.01) | |
| *H04L 29/08* | (2006.01) | |
| *H04L 12/24* | (2006.01) | |
| *H04L 29/06* | (2006.01) | |

(52) U.S. Cl.
CPC ............ *H04L 47/70* (2013.01); *H04L 41/18* (2013.01); *H04L 67/10* (2013.01); *H04L 67/34* (2013.01); *H04L 67/02* (2013.01); *H04L 67/42* (2013.01)

(58) Field of Classification Search
CPC ......... H04L 47/70; H04L 41/18; H04L 67/10; H04L 67/34; H04L 67/02; H04L 67/42
See application file for complete search history.

(56) References Cited

U.S. PATENT DOCUMENTS

| | | | | |
|---|---|---|---|---|
| 5,341,496 A | * | 8/1994 | Middledorp | G05B 19/41835 714/2 |
| 5,539,883 A | * | 7/1996 | Allon | G06F 9/5088 370/237 |
| 8,849,891 B1 | * | 9/2014 | Suchter | G06F 9/5038 709/202 |
| 2010/0036951 A1 | * | 2/2010 | Kamath | H04L 43/08 709/225 |
| 2011/0016223 A1 | * | 1/2011 | Iannaccone | H04L 45/00 709/232 |
| 2014/0214996 A1 | * | 7/2014 | Tamas | G06F 9/5038 709/212 |
| 2015/0074168 A1 | * | 3/2015 | Hartman | G06F 17/30091 709/201 |
| 2015/0254322 A1 | * | 9/2015 | Ma | G06F 9/5066 707/603 |

* cited by examiner

*Primary Examiner* — Glenford J Madamba
*Assistant Examiner* — Abderrahmen Chouat
(74) *Attorney, Agent, or Firm* — Hogan Lovells US LLP

(57) ABSTRACT

Approaches are described for managing workload, or other tasks in a data center, shared resource environment or other such electronic environment. In particular, a customer (or other end user, etc.) is able to use a computing device to submit a request to process information across at least one appropriate network to be received by a provider environment. The provider environment includes a set of resources (e.g., computing devices) operable to process the information for any of a variety of different purposes. Code can be deployed and executed at one or more of the host machines, wherein when executed, can enable the host machines to perform operations to process a workload in a distributed self-organizing manner, without a master server or other management device, to distribute work, handle situations where host machines go offline, etc.

20 Claims, 6 Drawing Sheets

MANAGING PROCESSOR LOAD IN A MULTI-TENANT ENVIRONMENT

BACKGROUND

As an increasing number of applications and services are being made available over networks such as the Internet, an increasing number of content, application, and/or service providers are turning to technologies such as cloud computing and Web services. In such environments, the hardware and/or software used to provide access to data and/or electronic resources typically needs to be scalable to meet the needs of various users at any given time. In order to spread the workloads of various customers across a set of resources, approaches such as load balancing are used to direct certain portions of the workloads to different resources, or sets of resources. However, the demands which are placed on such environments are dynamic in nature, and can vary in different aspects, which can cause difficulties in meeting the demands which are made of it.

BRIEF DESCRIPTION OF THE DRAWINGS

Various embodiments in accordance with the present disclosure will be described with reference to the drawings, in which.

DETAILED DESCRIPTION

Figure 1:
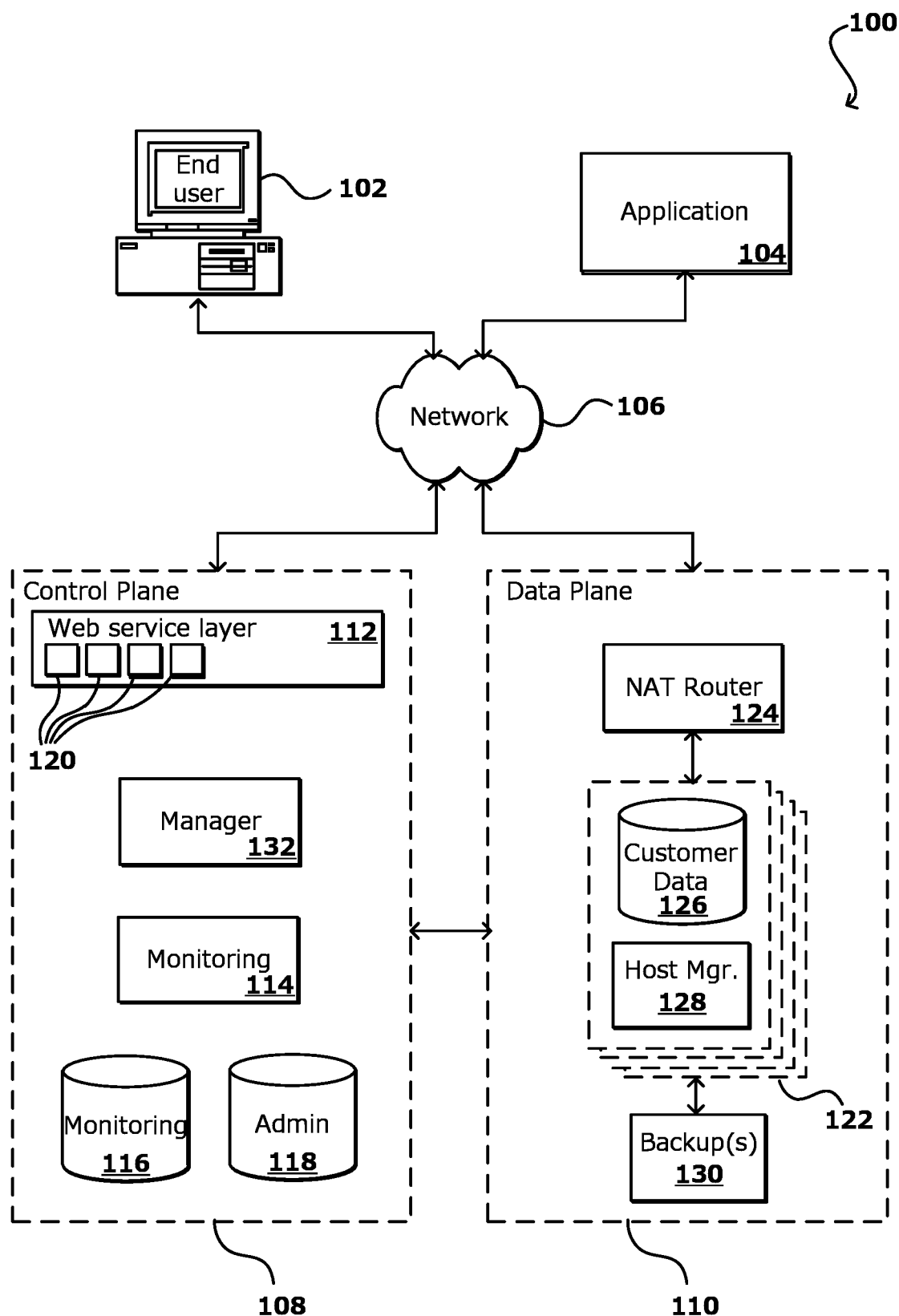
FIG. 1 illustrates an example environment in which various aspects can be implemented.

Systems and methods in accordance with various embodiments of the present disclosure may overcome one or more of the aforementioned and other deficiencies experienced in conventional approaches to managing workload, or other data in a data center, shared resource environment or other such electronic environment. In particular, a customer (or other end user, etc.) is able to use a client computing device to submit a request to process data across at least one appropriate network to be received by a provider environment. The customer can be any appropriate type of user, such as a software developer, a Web site operator, an application, or service provider. The provider environment includes, for example, a set of resources (e.g., computing devices) operable to process the information for any of a variety of different purposes. For example, in accordance with various embodiments, in response to receiving a request to process a workload and during an announce cycle, each computing device of a set of computing devices claim a portion of the workload that is not assigned to another computing device. In response to claiming a portion of the workload, a computing device generates an entry in a data store that identifies the computing device and the workload portion claimed. The entry can be a key value entry, where the key field of the key value entry includes an identifier or other reference identifying the workflow portion and the value field of the key value entry includes an identifier or other reference identifying the computing device that claimed the workload portion. During the announce cycle (e.g., at a start of an announce cycle), each computing device "announces" or otherwise provides information to each of the other computing devices that includes, for example, an identifier that identifies the computing device providing the information (e.g., the broadcasting computing device) and a list of the portions of the workload to be processed by the broadcasting computing device. As each computing device receives the information, the receiving computing devices record the broadcasting computing device's identifier and the portions of the workload claimed by the broadcasting computing device. The process continues until all portions of the workload are assigned. After it is determined that all portions of the workload are assigned, any computing device that has more workload portions assigned to it than a predetermined number of workload portions sends a message to a computing device that has the least number of workload portions to take over one of its workload portions. This is repeated until all workload portions are evenly distributed.

In certain embodiments it might be determined that some workload portions are unaccounted for, which can be an indication that a computing device is offline or otherwise not responsive. In this situation, the computing device that discovers this situation removes the key value entry associated with the offline computing device from the data store and sends a message to the possibly offline computing device to start processing the workload portion. If after a certain timeout the possibly offline computing device has not registered back, another computing device with the currently least amount of work assigned to it is assigned to begin processing that workload portion. Various other functions and advantages are described and suggested below as may be provided in accordance with the various embodiments.

Systems and methods in accordance with various embodiments provide at least one resource access gateway, or control plane 108, either as part of a data environment or in a path between an end user device 102 and a data plane 110, as illustrated in the example environment 100 of FIG. 1. A control plane can enable users and applications to access shared and/or dedicated resources, offered by one or more resource providers, while allowing customers, administrators, or other authorized users to allocate at least some of these resources to various users, clients, or applications and ensure adherence to those allocations. A user then can perform tasks such as processing, storing, and querying relational data sets in a "cloud" of these resources. For example, the user can submit a request to process information and the environment can distribute the processing of the information across a set of resources provided by the environment. Guest users can also obtain access to resources to perform any appropriate functionality. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared and/or dedicated access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

In the example of FIG. 1, a computing device 102 for an end user is shown to be able to make calls through at least one appropriate network 106, such as the Internet or a cellular network, for example, to a control plane 108 (or other such access layer) to perform a task such as to process information. While an end user computing device 102 and a third party application 104 are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs 120 (or other such interfaces) for receiving Web services calls or other such requests from across the network 106, which a Web services layer 112 can parse or otherwise analyze to determine the steps or actions needed to act on or process the call. For example, a Web service call might be received that includes a request to for certain information. The request can be information to be processed, such as data from a kinesis system. In this example, the Web services layer can parse the request to determine the type of connection or access needed, the appropriate type(s) of resource needed, or other such aspects.

The control plane can include one or more resource allocation managers 132, or "cloud managers," each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane 110, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching a domain name, IP address or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the IP address and a port number to be used to access a resource. A user then can access the resource directly using the IP address and port, without having to access or go through the control plane 108.

The control plane 108 in this embodiment also includes at least one monitoring component 114. When a data instance or other resource is allocated, created, or otherwise made available in the data plane, information for the resource can be written to a data store accessible to the control plane, such as a monitoring data store 116. It should be understood that the monitoring data store can be a separate data store or a portion of another data store. A monitoring component 114 can access the information in the monitoring data store 116 to determine information such as the past usage of resources by various users, a current number or type of hardware threads or other computing resources being allocated to a user, and other such usage information. A monitoring component also can call into components of the data environment to determine information such as the number of active network connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 118, which can store information such as the general allocation granted to a user, throttling or limiting information for a user, resource permissions for a user, or any other such information that can be specified and/or updated by an administrator or other such user.

In at least some embodiments, physical resources such as host servers can support one or more customer instances, which might each include a guest operating system (OS) and software that are to be executed on the host device. In an example where users request connections to various data instances, each instance 122 in the data environment can include at least one data store 126 and a host manager component 128 for the machine providing access to the data store. A host manager in one embodiment is an application or software agent executing on an instance and/or application server, such as a Tomcat or Java application server, programmed to manage tasks such as data processing and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 132 can communicate periodically with each host manager 128 for which a connection has been established, or to an administration server or other component of the resource environment, to determine status information such as load, utilization levels of various resources, capacity, etc.

As discussed, once a resource is provisioned and a user is provided with an IP address derived from DNS mappings or other address or location, the user can communicate "directly" with components or resources of the data plane 110. An IP address derived from DNS mappings is beneficial in such a dynamic cloud environment, as instance or availability failures, for example, can be masked by programmatically remapping the IP address to any appropriate replacement instance for a use. Other dynamic mappings of addresses to physical substrate servers are possible, for example with the use of network address translation (NAT) or overlay networks. A request received from a user device 102 or application 104, for example, can be directed to a NAT router 124, or other appropriate component, which can direct the request to the actual resource 122 or host corresponding to the mapped address of the request. Such an approach allows for instances to be dynamically moved, updated, replicated, etc., without requiring the user or application to change the IP address or other address used to access the instance. In some cases, a resource 122 such as a data instance can have at least one backup instance 130, copy in persistent storage, etc.

As discussed, a resource can be shared among multiple users, clients, applications, etc., either concurrently or at different times, with varying levels of access or allocation. When a user has dedicated access to a machine or resource, the user might also have native access to the resource for a period of time, depending on the type of access needed, and other such factors. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and simpler guest instance images can be used, as guests do not need a multitude of hardware-specific drivers.

Resource providers can, in at least some embodiments, provide for "partial" or "substantially" full access to a resource, such as a host server, by providing users with native access to the host hardware or specific devices, such as cards plugged into a peripheral control bus or similar data path. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine running an OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some embodiments, virtualization or other such technology can be used to provide a level of separation between guests and host machines from the central system hardware (e.g., CPU, memory, etc.), with native access potentially being available for specific devices on a given host. In other embodiments, native access can be provided to any hardware included in, or available for, a specific host. The electronic environment in such cases might include additional components and/or other arrangements, such as those illustrated in the configuration 200 of FIG. 2, discussed in detail below.

Figure 2:
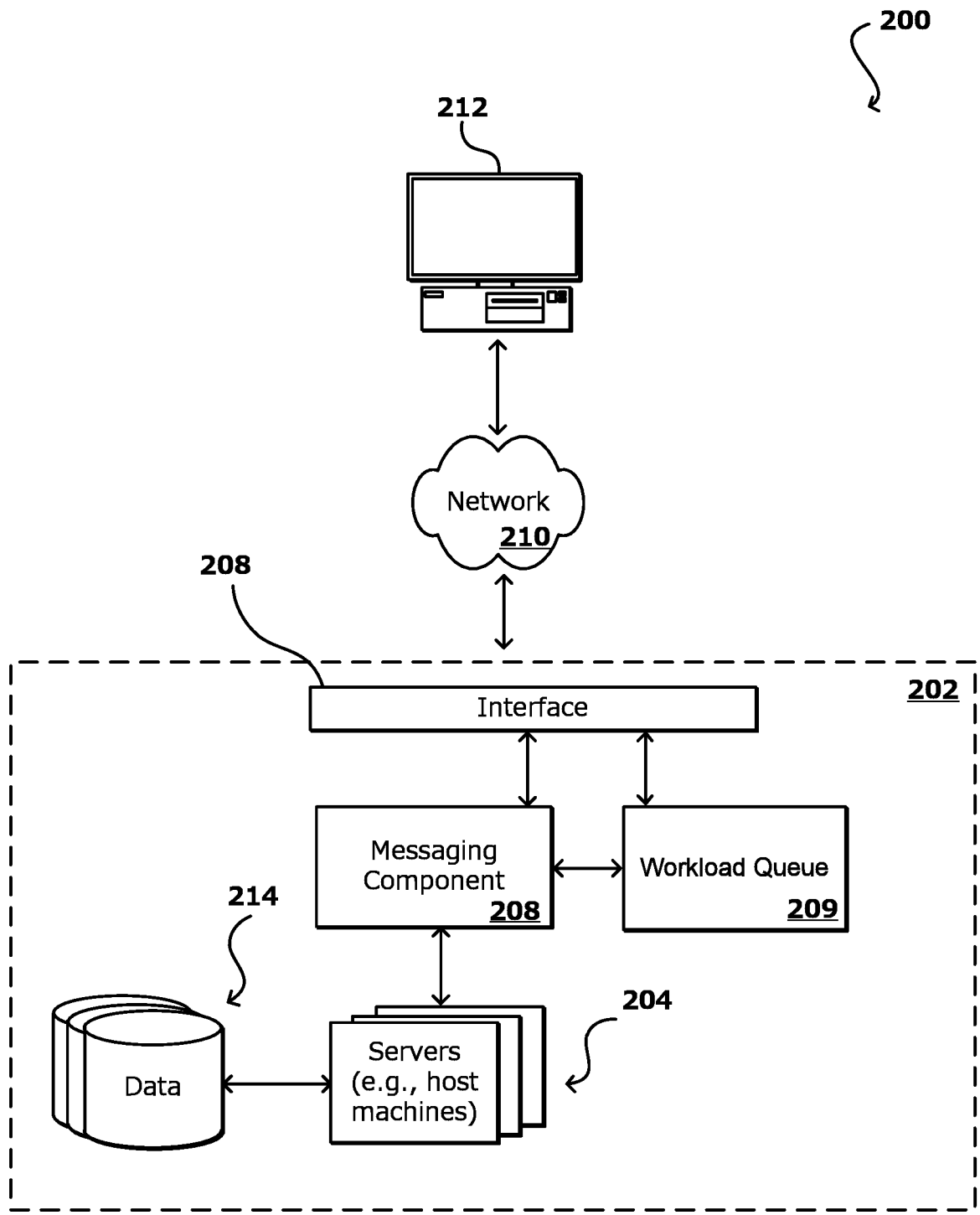
FIG. 2 illustrates an example implementation in which data processing can be distributed across a plurality of computing resources in accordance with various embodiments.

For example, FIG. 2 illustrates an example configuration 200 in which data can be processed in accordance with various embodiments. In this example, a customer (or other end user, etc.) is again able to use a computing device 212 to submit a request across at least one appropriate network 210 to be received by a network interface layer 208 of a provider environment 202. The customer can be any appropriate type of user, such as a software developer, a Web site operator, or an application, content, or service provider. The environment includes a set of servers 204 operable to perform tasks and process jobs for any of a variety of different purposes. For example, a customer might utilize a computing device 212 to submit a request across at least one network 210 (e.g., a local area network, cellular network, or the Internet) that is received by one or more components or interfaces of a networking layer 208 and directed to a distributed self-organizing group of servers 204. Also shown is a messaging component 208. The messaging component is operable to facilitate the processing of a request received from the customer 212 (or otherwise generated). For example, the messaging component 208 can utilize one of a number of communication protocols to manage communication between the set of servers. Further, the messaging component can partition (if needed) into one or more portions. Further still, the messaging component, or other such component or entity, can send information, such as code, files, and/or data, to the set of resources resource that includes instructions how the set of severs is to operate when processing a workflow.

In at least some embodiments, information for a request can be temporarily stored in at least one workload queue 209. There can be one workload queue for a resource provider environment 202, one per resource, one per workload, or any other appropriate selection. The information can be stored in the workload queue until a resource with the necessary capacity becomes available. In some embodiments, the workload queue will be part of a queuing service or system that can push out work as capacity becomes available, while in other embodiments the workload queue will act as a quasi-FIFO buffer wherein resources (e.g., workload servers) can pull workload portions from the top of the queue, except where other priority applies as discussed elsewhere herein. In addition to the request, any appropriate information, such as data files or references to outside resources such as database services or code services as discussed elsewhere herein can be provided.

The resource provider can process the request and return a result to an appropriate API or other address or interface of the user service. The result might be a modified data set or file, for example, or might simply be a notification that a task has completed. For example, if the task to be performed involves processing an image then the result back to the user service could be the processed image, or could be a notification that the image was processed and stored or delivered to a specified location, etc. In at least some embodiments, the workload can be executed asynchronously such that the distributed self-organizing group of servers can send off the information for the workload and go on with other processes until the result of the workload is received back.

As described, code can be deployed and executed at one or more of the servers in the distributed self-organizing group of servers, wherein when executed, can enable the servers to perform operations to process a workload in a distributed self-organizing manner, without a master server or other management device, to distribute work, handle situations where servers go offline, etc. In this example, a set of servers can register to be part of a distributed self-organizing group of servers. As additional servers join the group, information can be provided to each server that includes at least the identification of the joined server. This can include, for example, each server communicating identification information to other servers, providing identification to a messaging component (e.g., messaging component 208) to distribute to other servers, etc. Servers and other resources can leave and join the self-organizing group of resources as needed.

When a request to process a workload is received, the code at each of the set of servers can enable each server to process the workload. In accordance with various embodiments, workload (e.g., one or more tasks, data, etc.) can be partitioned into one or more portions by one of the servers, some other entity, or a combination thereof. Alternatively, the workload can be received partitioned. In the situation where the request is received already partitioned, the request can include information that identifies the number of portions that make up the workload. In the situation where the workload is partitioned after being received, information indicating the number of partitions can be associated with the workload.

During an "announce" cycle, each server attempts to claim one or more portions of the workload and provides identifying information that can be used to identify a respective server and the workload portions claimed by each respective server. For example, in an embodiment, as servers become available (e.g., online), the available servers attempt to claim a portion of the workload. When a server claims a portion of the workload, the server generates an entry in a data store (e.g., data store 214) that identifies the server and the portion claimed. The data store 214 can be a secure data store. The entry can be a key value entry, where the key field of the key value pair includes an identifier or other reference identifying the workflow portion and the value field of the key value pair includes an identifier or other reference identifying the server to process the workflow portion. It should be noted that other data stores are contemplated by the embodiments described herein. It should be further noted that a key value entry is an example of a type of entry and other entries are contemplated by the embodiments described herein. The next available server claims an available portion of the workload and generates a respective entry in the data store 214. The process continues until all portions of the workload are assigned.

In an embodiment, the servers claim a portion of the workload as they become available. In another embodiment, the servers claim a portion of the workload in a particular order, where the order can be a random order or based on predetermined instructions. In accordance with an embodiment, for each portion obtained by a server, the server waits a predetermined amount of time before attempting to obtain an additional portion of the workload. The predetermined amount of time includes, for example, 250 milliseconds. In certain embodiments, a first server (e.g. the first online server) announces its presence. This marks the beginning of an announce cycle, the announce cycle lasting a predetermined amount of time. As additional servers become available, the additional servers announce their presence. A predetermined amount of time after the first server claims the workload, the first server begins assigning portions of the workload to the announced servers. Assigning the workload to the announced servers can include, for example, assigning workload to announced servers with the least amount of work. In the situation where two or more servers are tied for having the least amount of work, the first server can assign work to such servers randomly, in the order they came online, or in some other order. As the first server assigns portions of the workload, additional servers may have become available and announced their presence. At the end of the predetermined amount of time, a second announce cycle begins. Some of the announced servers have been assigned workload while others have not. Additionally, some of the initial servers may be overcapacity. In this situation, servers that are over capacity can assign portions of their workload to servers that are under capacity. This process is repeated until the work is distributed.

At the end of an announce cycle, or in certain embodiments in response to a server obtaining or being assigned a portion of the workload, the servers "broadcasts" (i.e., provide) information to each of the servers in the set of servers. The information can include, for example, an identifier that identifies the server (e.g., the broadcasting server) providing the information and a list of the portions of the workload to be processed by the broadcasting server. In accordance with various embodiments, a server can provide the information to the messaging component which can provide the information to each of the servers, the server can provide the information to each of the servers directly, or a combination thereof. As each server receives the information from the broadcasting server, the receiving servers record the broadcasting server's identifier and the portions of the workload that the broadcasting server is processing or has scheduled to process. The information can be recoded in data store 214, in onboard memory associated with each receiving server, or another data storage device.

In accordance with an embodiment, the announce cycle ends when all portions of the workload are claimed. In various embodiments, the announce cycle ends when all portions of the workload are claimed and a minimum amount of time has elapsed since the start of the announce cycle. An example minimum time can be 10 seconds. At the end of each announce cycle, each participating server will have received one or more listings from each server that identifies the portions of workload each participating server is assigned to. Using the received listings, each server can determine an amount of workload for each of the other servers. In accordance with various embodiments, the amount of workload can be the number of workload portions assigned to a server. To determine whether to balance the workload across the servers, the amount of workload associated with each server can be compared to a threshold operating capacity. Servers above the threshold operating capacity can reassign workload portions to servers below the threshold operating capacity. The threshold operating capacity can be, for example, the total number of workload portions divided by the total number of servers, for example, rounded up. It should be noted that other approaches can be used to determine the threshold operating capacity as is known to those skilled in the art, for example, each participating server could have a different processing capacity so the load would not be distributed evenly.

In the situation where a server (e.g., an over-capacity server), has more workload portions than the threshold operating capacity, the over-capacity sever can assign to a server (e.g., an under-capacity server) that has less than the threshold operating capacity at least some of their extra workload portions. For example, the over-capacity server can identify servers that have less than the threshold operating capacity. If the under-capacity server would still have less than the threshold operating capacity after receiving an additional portion of the workload, the over-capacity server can assign a portion of workload to the under-capacity server. The process can continue until each over-capacity server is no longer over capacity or until there are no under-capacity servers. In the situation where there are multiple under-capacity servers, the server that is the most under capacity is first assigned a workload portion.

In the situation where an over-capacity server assigns a workload portion to a server, the over-capacity server removes the entry from the data store indicating that the assigned workload portion was to be processed by the over-capacity server and provides reassign information to the server receiving the workload portion. Once the receiving server receives the workload portion, the receiving server generates an entry in the data store that associates the workload portion and the receiving server. The receiving server then provides (e.g., broadcasts) information (e.g., an identifier that identifies the server and a list of the portions of the workload to be processed by the server) to each of the distributed self-organizing group of servers.

In certain embodiments, one or more workload portions may not be accounted for. As described, the workload is partitioned or otherwise segmented into one or more portions that can be claimed by the set of servers in the distributed self-organizing group of servers. Each server includes information that indicates the total number of workload portions and information about the number of workload portions assigned to each server. Based on the total number of workload portions and the number of portions assigned to each server, a determination can be made whether all workload portions are assigned. The determination can be made by one or more of the servers. For example, in accordance with an embodiment, a server that determines that it is at capacity can then determine whether all workload portions are accounted for. It should be noted that other approaches can be used to determine the server that makes the determination. For each unaccounted for workload portion, the key indicating that the workload portion to be processed by another server is removed from the data store. Next, a server determines an available server to receive the unaccounted for workload portion. In this example, the server that removed the entry can determine an available server. An available server is a server determined to be under capacity. Once the available server receives the unaccounted for workload portion, the available server generates an entry in the data store that includes a reference to the received workload portion and its identity. Thereafter, the server broadcasts information (e.g., an identifier that identifies the server and a list of the portions of the workload to be processed by the server) to each of the servers in the set of servers. The process repeats until all portions of the workload are accounted for or until another such event is detected. For example, the process can repeat after a predetermined amount of time of assigning an unaccounted for workload portion to a server has passed. When no more workload portions need to be assigned, the process can end.

In some embodiments, a situation may arise where a server receives a reassign request but the server determines that it was already assigned the workload portion being reassigned to it. This can occur if another server (e.g., the server sending the reassign request) determines that the server (e.g., the server receiving the reassign request) has gone stale because it failed to respond in the announce cycle. In this situation, the data store is analyzed (e.g., by the requesting server or the receiving server) to determine whether the reassigned workload portion includes an entry assigning the reassigned workload portion to another server. In the situation that the workload portion includes such an entry, the server that received the reassign information stops all work on the reassigned workload portion. In the situation where no other server is processing the reassigned workload portion, a new entry is generated in the data store indicating that the reassigned server is processing the workload portion. In the situation where the server that received the reassign request does not determine that it is assigned the workload portion being reassigned to it, a new entry is generated in the data store indicating that the reassigned server is processing the workload portion.

In accordance with various embodiments, an advantage of such an approach is that a significant portion of the work can be offloaded from a user machine to one or more remote services or virtual instances distributed in a self-organizing manner. The approach can be thought of as outsourcing threads to remote machines that are able to process a particular task and then return the result. For any portion of a workload that can be offloaded to another device for execution, a user can select to execute this workload for some or all of the tasks to a workload service, offered by a resource provider, in order to ensure that the user's machines are not overloaded, as well as to reduce the capacity of resources that the user must provide and support locally.

In accordance with various embodiments, an example of a type of workload that can take advantage of approaches in accordance with the various embodiments relates to a scheduling machine that operates for an entity. A scheduling process might perform various tasks on a scheduled basis, where different types of tasks have different frequencies of processing. For at least some examples, the timing of at least some of those processes might intersect, which could potentially cause an availability problem with the user system, or at least require the user to obtain more capacity than is normally needed in order to handle the intersecting processes. For example, if one process runs every hour and another process runs every fifteen minutes, each process running for about five minutes, the user might not appreciate having to have multiple machines active to handle the five minutes per hour where the two processes are both active. By utilizing a distributed self-organizing group of resources, on the other hand, the scheduler can sent out requests for processing at the scheduled times without worry about consuming too many resources or purchasing excess capacity. The work can be performed by an appropriate resource instance and the result returned as appropriate.

In various embodiments, the processing of the workload portions can occur over a highly connected network, which can utilize devices such as high-throughput commodity switches (i.e., switches or routers with relatively small buffers compared to the amount of throughput). The network and the host devices can be provided and/or utilized in any appropriate electronic environment, such as a data center offering shared resources or other multi-tenant environments, as well as any non-virtualized or otherwise private data center. Although various embodiments described herein are discussed in regard to a particular network topology (such as the one described in FIG. 1), it should be understood that embodiments described herein for managing workload or other information can apply to any network topology. That is, in accordance with embodiments described herein, a management system or any control system can be used to automatically process workload in any network topology. In still further embodiments, such approaches can be provided as a service that can be used to remotely process information in a customer's network environment, while in still other embodiments, such approaches can be provided to, and included as part of a customer's network environment, e.g., as a management system component or other such control component, that can be used to process information in accordance with embodiments described herein.

Figure 3:
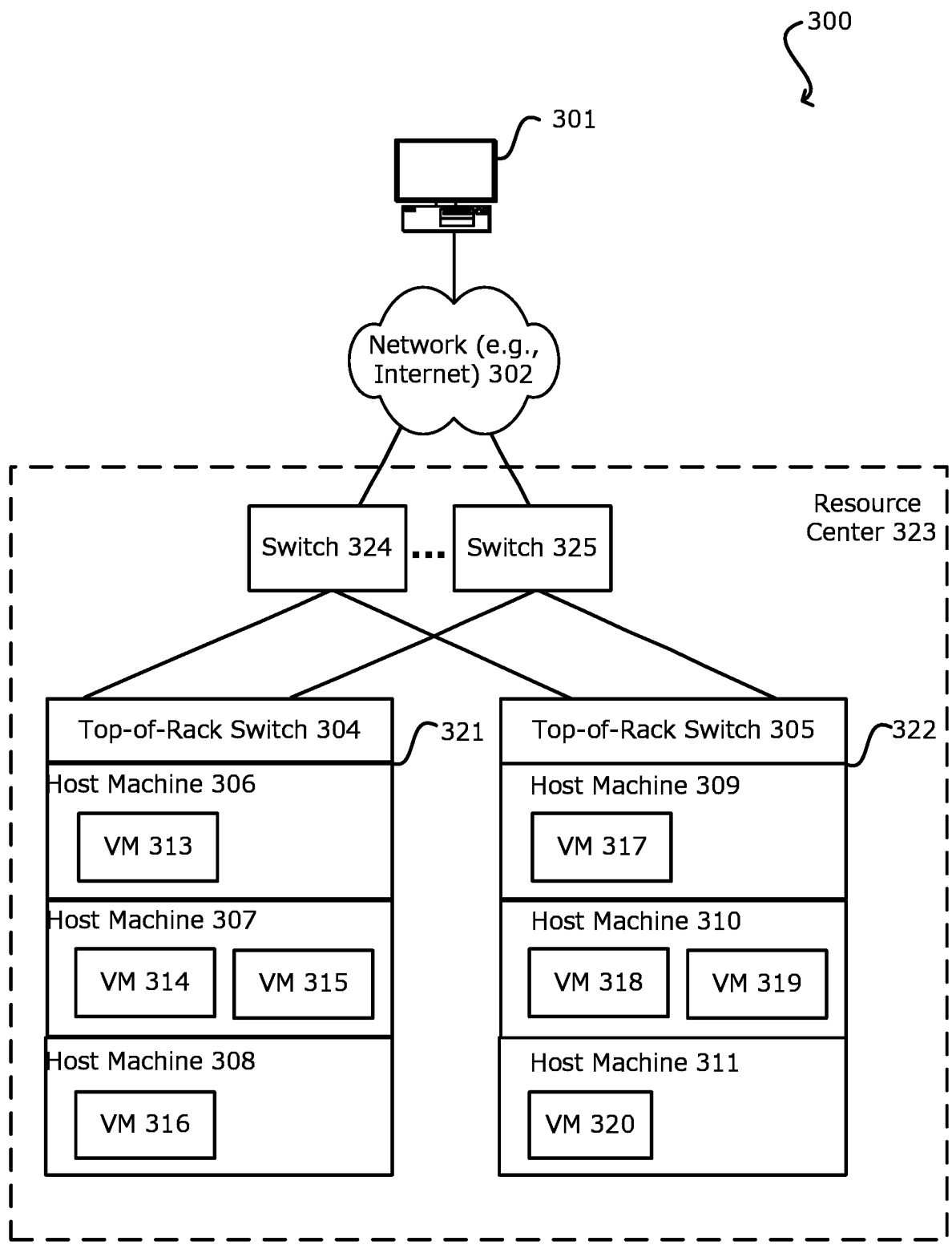
FIG. 3 illustrates an example environment in which various aspects can be implemented.

The electronic environment in such cases might include additional components and/or other arrangements, such as those illustrated in the configuration 300 of FIG. 3, discussed in detail below. For example, FIG. 3 illustrates a resource center environment of the service provider that provides computing resources for a customer, in accordance with various embodiments. In the illustrated embodiment, a service provider (e.g., a cloud computing resource provider) can maintain one or more resource centers 323 (e.g., data centers, server farms, etc.) that store the physical resources (e.g., host servers, etc.) of the service provider. These physical resources can be used to host a number of virtual machine instances or virtual servers that can be provided to users 301 over a network 302, such as the Internet. For example, when a user wants to execute an application, process information, among other tasks using the physical resources of the service provider, he or she may request the service provider to provision one or more virtual machines for the user, which will be used to deploy and execute request. As demand for the user's request increases, the user can request that more virtual machines be provisioned to balance the load, request creation of one or more virtual private networks (VPNs) and the like.

In the illustrated example, the resource center 323 of the service provider may include one or more racks 321, 322 of host servers (306, 307, 308, 309, 310, 311) wherein each host machine on a particular rack is connected to a single top-of-rack (TOR) switch (304, 305). These TOR switches can be further connected to one or more other switches (324, 325) which enable the host servers to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host server can host one or more virtual machine instances (313, 314, 315, 316, 317, 318, 319, 320) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance; the customer can first submit a request to the service provider, indicating the type of VM they would like to use. The service provider may carry out the processes to provision the virtual machine instance which will be hosted on the physical resources (e.g., host machines) of the service provider. The virtual machine instance can then be used to execute the various applications and services on behalf of the customer, utilizing the resources of the service provider. For example, in one such situation, a customer or service provider can use the example environment to process data. In this example, a set of resources can register to be part of a distributed self-organizing group of servers that can be used to process data. An advantage of such an approach is that a significant portion of the work can be offloaded from a user machine to one or more remote services or virtual instances distributed in a self-organizing manner. The approach can be thought of as outsourcing threads to remote machines that are able to process a particular task and then return the result. For any portion of a workload that can be offloaded to another device for execution, a user can select to execute this workload for some or all of the tasks to a workload service, offered by a resource provider, in order to ensure that the user's machines are not overloaded, as well as to reduce the capacity of resources that the user must provide and support locally.

Figure 4:
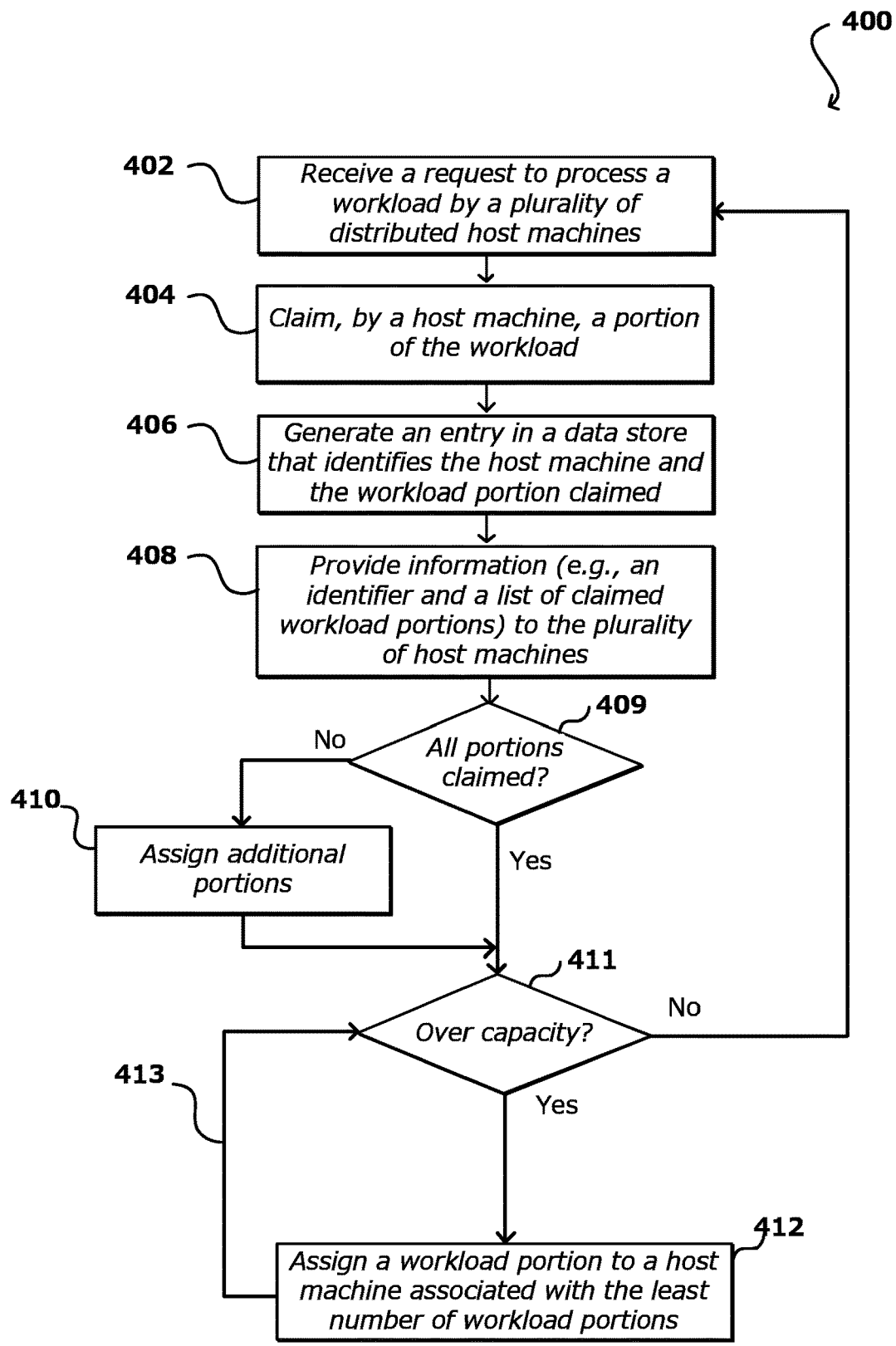
FIG. 4 illustrates an example process for processing data in accordance an embodiment.

FIG. 4 illustrates an example process 400 for managing data processing in accordance with various embodiments. It should be understood that, for any process described herein, that there can be additional or fewer steps performed in similar or alternative orders, or in parallel, within the scope of the various embodiments unless otherwise stated. It should be noted that the embodiments described herein are not restricted to any one network topology, and instead can advantageously be applied to any network topology organized in any number of hierarchical layers, where each layer can contain a multiplicity of switching devices that can route communication traffic between host devices or layers of other switching devices. A request to process a workload using a plurality of distributed resources (e.g., host machines) operating in a distributed computing environment is received 402, the request including data to be processed as part of the workload. In response to receiving the request, each host machine claims 404 a portion of the workload that is not assigned to another host machine. When a host machine claims a portion of the workload, the host machine generates 406 an entry in a data store that identifies the host machine and the workload portion claimed. The entry can be a key value entry, where the key field of the key value entry includes an identifier or other reference identifying the workflow portion and the value field of the key value entry includes an identifier or other reference identifying the host machine to process the workflow portion. In response to claiming a portion of the workload by a host machine, at the end of a predetermined amount of time, the start of a cycle of time (e.g., an announce cycle), or some other period, range, cycle of time, the host machine "announces" or otherwise provides 408 information (e.g., an identifier that identifies the host machine a list of claimed workload portions claimed by the host machine) to the plurality of host machines. As each host machine receives the information, the receiving host machine records the broadcasting server's identifier and the portions of the workload that the broadcasting host machine is processing or has scheduled to process. The next available host machine claims an available portion of the workload and generates a respective entry in the data store. A determination 409 is made whether all portions of the workload are claimed. In the situation it is determined that all portions of the workload are not claimed, one of the host machines assigns 410 the additional portions to one or more other host machines. The process continues until all portions of the workload are claimed. After it is determined that all portions of the workload are assigned, a determination 411 is made whether any host machine is over capacity, for example, has claimed more workload portions than a threshold operating capacity. In the situation where it is determined a host machine is over capacity, that host machine assigns 412 a workload portion to a host machine associated with the least number of workload portions. This is repeated 413 until all workload portions are evenly distributed. In the situation where it is determined that no host machine is over capacity, the process repeats as additional request are received and the host machines continue processing the workload.

Figure 5:
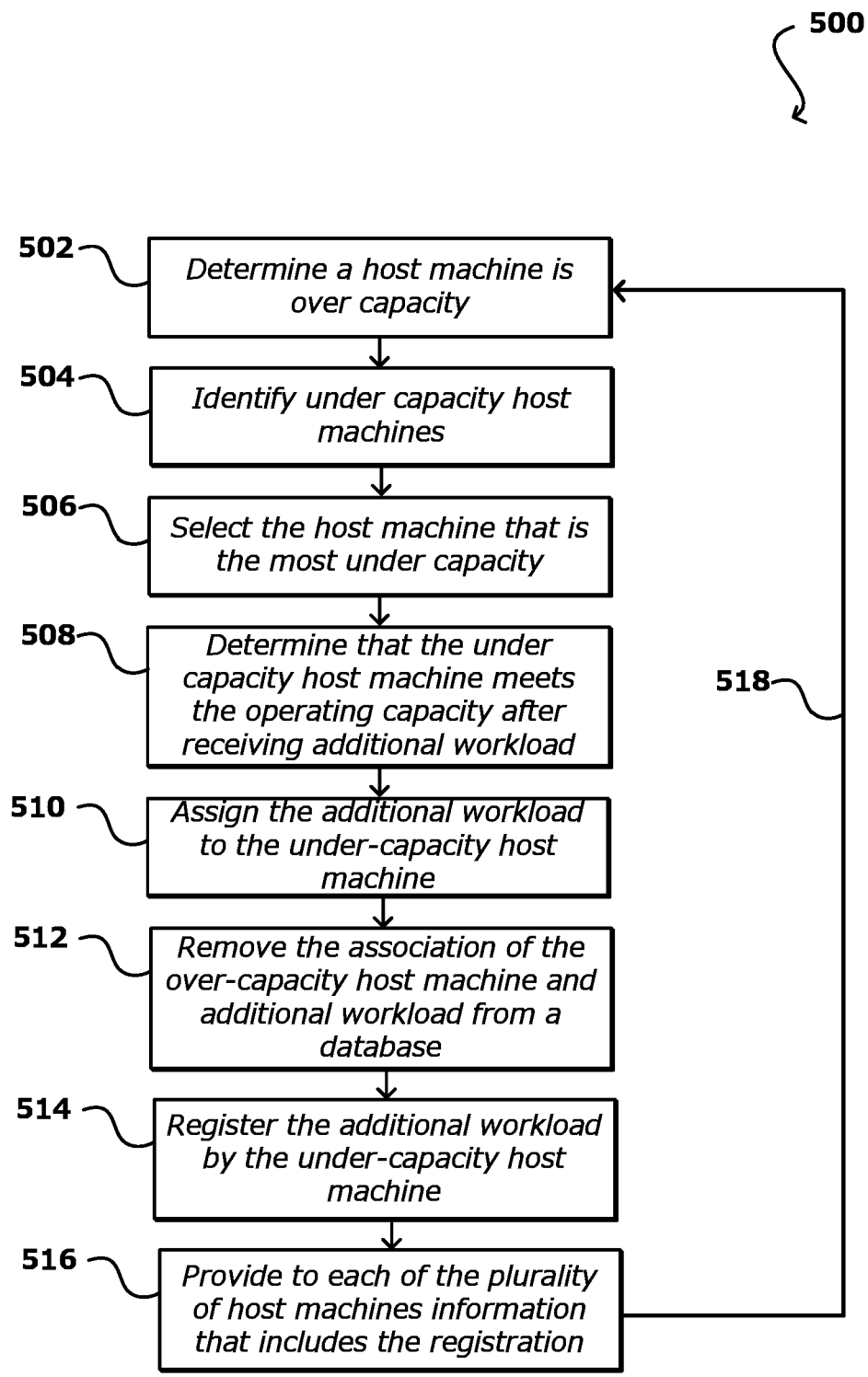
FIG. 5 illustrates an example process for processing data in accordance with an alternate embodiment.

FIG. 5 illustrates an example process 500 for managing data processing in accordance with various embodiments. As described, in the situation where it is determined 502 that a host machine (e.g., an over-capacity host machine) is over capacity (e.g. has more workload portions than the threshold operating capacity) the over-capacity host machine can assign to a host machine (e.g., an under-capacity host machine) that has less the threshold operating capacity at least some of their extra workload portions. For example, the over-capacity host machine can identify 504 under capacity host machines (e.g., host machines that have less workload portions than the threshold operating capacity) and the host machine the most under capacity is selected 506 to receive additional workload. When it is determined 508 that the under-capacity host machine would still have less than the threshold operating capacity after receiving an additional portion of the workload, the over-capacity host machine can assign 510 the additional portion of the workload to the under-capacity host machine. The over-capacity host machine then removes 512 the association from the data store indicating that the additional workload portion was to be processed by the over-capacity host machine. The under-capacity host machine registers 514 (e.g., generates an entry in the data store that associates the additional workload portion and the under-capacity host machine) the additional workload and provides (e.g., broadcasts) 516 information of the registration (e.g., an identifier that identifies the host machine and a list of the portions of the workload to be processed by the host machine) to each of the plurality of host machines. The process can repeat 518 until each over-capacity host machine is no longer over capacity or until there are no under-capacity host machines.

Figure 6:
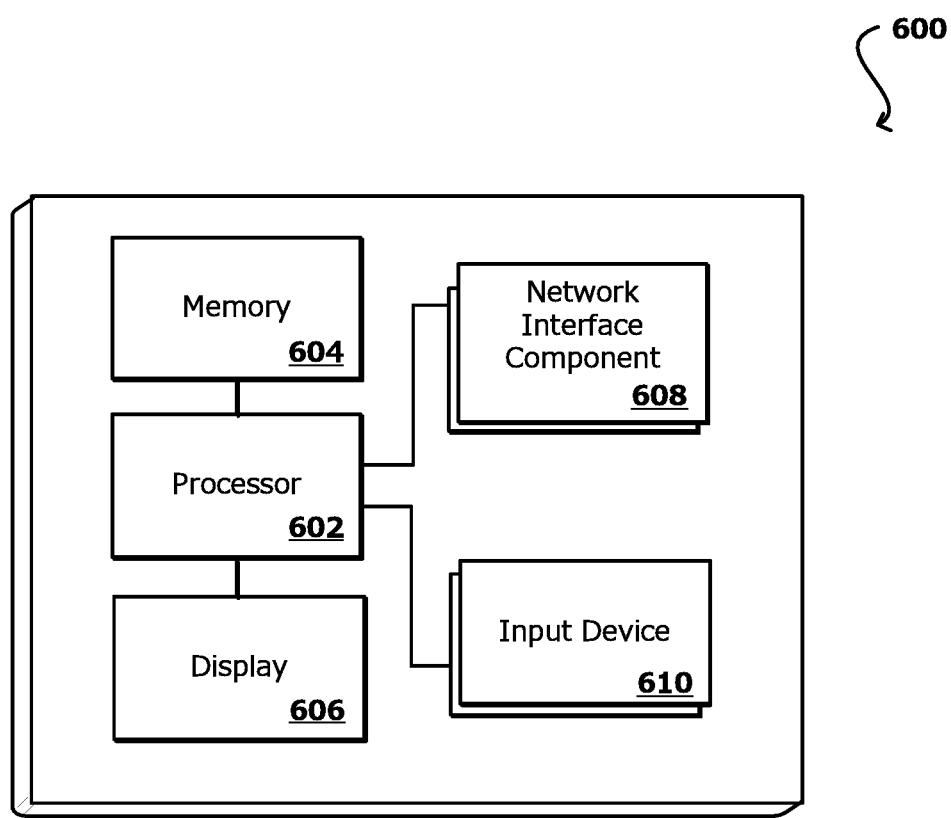
FIG. 6 illustrates example components of a client device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input device 610 can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a request to process a workload using a plurality of host machines operating in a distributed computing environment, the request including data to be processed as part of the workload and the request being transmitted to at least one of the plurality of host machines;
obtaining, by a first host machine of the plurality of host machines, a first portion of the data to process, the first host machine associated with a first identifier;
providing, by the first host machine, the first identifier and a first listing that includes the first portion of the data to be processed by the first host machine to each of the plurality of host machines;
generating, by the first host machine, a first key value entry identifying the first host machine and the first portion of the data;
storing the first key value entry in a data store, the data store being a common data store accessible by each host machine of the plurality of host machines;
receiving, after an announce cycle indicative of an availability to receive data, by a second host machine of the plurality of host machines, a second portion of the data to process, the first identifier, and the first listing, the second host machine associated with a second listing that includes the second portion of the data;
generating, by the second host machine, a second key value entry identifying the second host machine and the second portion of the data;
storing the second key value entry in the data store;
analyzing, by the second host machine, the first listing to determine a first operating capacity of the first host machine;
analyzing, by the second host machine, the second listing to determine a second operating capacity of the second host machine;
determining, by the second host machine, that the first operating capacity does not exceed a threshold operating capacity, the threshold operating capacity determined by analyzing listings provided by at least a subset of the plurality of host machines;
determining, by the second host machine, that the second operating capacity exceeds the threshold operating capacity;
sending a first subset of the second portion of data from the second host machine to the first host machine for processing by the first host machine, the first host machine being selected to attempt to balance work capacity across the plurality of host machines;
removing, from the data store, the second key value entry;
generating, by the first host machine, a third key value entry identifying the first host machine and the first subset of the second portion of the data;
generating, by the second host machine, a fourth key value entry identifying the second host machine and a second subset of the second portion of the data; and
storing the third key value entry and the fourth key value entry in the data store.

2. The computer-implemented method of claim 1, further comprising:
  accessing a data store to remove a key value entry that associates the second host machine and the subset of the second portion of data; and
  generating an entry to a new key value entry that associates the first host machine and the subset of the second portion of data.

3. The computer-implemented method of claim 1, wherein each of the plurality of host machines is configured to perform at least one of: execute one or more checks to verify each portion of the workload is assigned, send out an announce broadcast, associated with the announce cycle, that includes a name of a respective host machine and portions of the workload to be processed, shift portions of the workload to and from host machines, generate and remove entries in a data store, or send a reassign message to host machines.

4. A computer-implemented method, comprising:
  obtaining data to be processed using a set of resources via a request transmitted to the set of resources;
  obtaining, by each resource of the set of resources, one or more portions of the data;
  generating, by each respective resource of the set of resources, a respective entry, for inclusion in a data store commonly accessible by each resource of the set of resources, identifying each respective resource of the set of resources and the one or more portions of the data obtained by each respective resource of the set of resources;
  storing the respective entry in the data store;
  determining, by each resource, an expected operating capacity associated with processing respective portions of the data;
  determining, by each resource, whether a respective expected operating capacity is above a threshold operating capacity;
  determining, by each resource after an announce cycle indicative of an availability to receive data, whether to send data to resources of the set of resources associated with an expected operating capacity below the threshold operating capacity based at least in part on each respective resources operating capacity;
  removing a specified entry corresponding to one or more portions of data that have been sent from a first resource operating above the threshold operating capacity to a second resource operating below the threshold operating capacity;
  generating, by the second resource, a new entry identifying the second resource and the one or more portions of data;
  storing the new entry in the data store;
  determining, by the second resource, the second resource is operating above the threshold operating capacity after receiving the one or more portions of data from the first resource;
  determining, by the second resource, the first resource is operating below the threshold operating capacity after sending the one or more portions of data;
  selecting a subset of the one or more portions of data to send to the first resource;
  generating, by the second resource, a second new entry identifying the second resource and the remaining one or more portions of data;
  generating, by the first resource, a third new entry identifying the first resource and the subset of the one or more portions of data; and
  storing the second new entry and the third new entry in the data store.

5. The computer-implemented method of claim 4, wherein determining, by each resource, whether to shift data further includes:
  analyzing the set of resources to identify a resource with the least amount of work capacity to select as a resource to receive additional data to process.

6. The computer-implemented method of claim 4, wherein obtaining, by each resource, a portion of the data further includes:
  obtaining, by a first resource of the set of resources, a first portion of the data;
  analyzing, by the first resource, a data store of entries to determine whether the first portion is assigned to a different resource of the set of resources; and
  generating, in response to determining that the first portion is available to be processed, an entry in a data store that includes an identifier associated with the first resource and a reference to the first portion.

7. The computer-implemented method of claim 4, further comprising:
  determining that a first resource of the set of resources is associated with a first operating capacity below the threshold operating capacity;
  determining that a second resource of the set of resources is associated with a second operating capacity above the threshold operating capacity; and
  sending an additional portion of data associated with the second resource to the first resource for processing.

8. The computer-implemented method of claim 6, wherein
  an entry includes a key value pair, the key referencing a portion of the data, the value referencing a resource to process the portion of the data.

9. The computer-implemented method of claim 7, further comprising:
  providing, by the first resource, an identifier identifying the first resource and a listing that identifies the additional portion of the data to be processed by the first resource to each of the set of resources.

10. The computer-implemented method of claim 4, further comprising:
  receiving, at each resource for a subset of the resources, a set of listings that includes portions of the data to be processed;
  analyzing the set of listings to determine an unaccounted for portion of the data, the unaccounted for portion associated an offline resource;
  accessing a data store to remove a key value entry that associates the offline resource and the unaccounted for portion of the day; and
  sending the unaccounted for portion of the data to at least one other resource for processing.

11. The computer-implemented method of claim 10, wherein prior to sending the unaccounted for portion to the at least one other resource:
  sending a message to the offline resource to begin processing the unaccounted for portion of the data;
  determining that a predetermined period of time has elapsed; and
  sending the unaccounted for portion of the data to the at least one other resource.

12. The computer-implemented method of claim 10, further comprising:

determining that the at least one other resource was previously assigned the unaccounted for portion of the data;

analyzing the data store to determine that the unaccounted for portion of the data is not associated with a resource; and generating an entry in the data store associating the unaccounted for portion of the data with the at least one other resource.

13. The computer-implemented method of claim 4, further comprising:

determining that the at least one other resource was previously assigned the unaccounted for portion of the data;

analyzing a data store to determine that the unaccounted for portion of the data is associated with another resource; and stopping processing of the unaccounted for portion by the at least one other resource.

14. The computer-implemented method of claim 4, wherein the expected operating capacity is based at least in part on a ratio of a number of portions of the data and a number of resources of the set of resources.

15. A system, comprising:

a processor;

a set of resources; and memory including instructions that, when executed by the processor, enable the system to:

obtain data to be processed using a set of resources via a request transmitted to the set of resources;

obtain, by each resource of the set of resources, one or more portions of the data;

generate, by each respective resource of the set of resources, a respective entry, for inclusion in a data store commonly accessible by each resource of the set of resources, identifying each respective resource of the set of resources and the one or more portions of the data obtained by each respective resource of the set of resources;

store the respective entry in the data store;

determine, by each resource, an expected operating capacity associated with processing respective portions of the data;

determine, by each resource, whether a respective expected operating capacity is above a threshold operating capacity;

determine, by each resource after an announce cycle indicative of an availability to receive data, whether to send data to resources of the set of resources associated with an expected operating capacity below the threshold operating capacity based at least in part on each respective resources operating capacity;

remove a specified entry corresponding to one or more portions of data that have been sent from a first resource operating above the threshold operating capacity to a second resource operating below the threshold operating capacity;

generate, by the second resource, a new entry identifying the second resource and the one or more portions of data;

store the new entry in the data store;

determine, by the second resource, the second resource is operating above the threshold operating capacity after receiving the one or more portions of data from the first resource;

determine, by the second resource, the first resource is operating below the threshold operating capacity after sending the one or more portions of data;

select a subset of the one or more portions of data to send to the first resource;

generate, by the second resource, a second new entry identifying the second resource and the remaining one or more portions of data;

generate, by the first resource, a third new entry identifying the first resource and the subset of the one or more portions of data; and store the second new entry and the third new entry in the data store.

16. The system of claim 15, wherein the instructions, when executed further enable the system to:

obtain, by a first resource of the set of resources, a first portion of the data;

analyze, by the first resource, a data store of entries to determine whether the first portion is assigned to a different resource of the set of resources; and generate, in response to determining that the first portion is available to be processed, an entry in a data store that includes an identifier associated with the first resource and a reference to the first portion.

17. The system of claim 16, wherein the instructions, when executed further enable the system to:

provide, by the first resource, an identifier identifying the first resource and a listing that identifies the first portion of the data to be processed by the first resource to each of the set of resources;

receive, by a second resource of the set of resources, a second portion of the data, the first identifier, and the first listing, the second resource associated with a second listing that includes the second portion of the data;

analyze, by the second resource, the first listing to determine a first operating capacity of the first resource;

analyze, by the second resource, the second listing to determine a second operating capacity of the second resource;

determine that the first operating capacity does not satisfy a threshold operating capacity, the threshold operating capacity determined by analyzing listings provided by at least a subset of the set of resources;

determine that the second operating capacity exceeds the threshold operating capacity; and send a subset of the second portion of the data from the second resource to the first resource for processing by the resource.

18. The system of claim 15, wherein the instructions, when executed further enable the system to:

analyze the set of resources to identify a resource with the least amount of work capacity to select as a resource to receive additional data for processing.

19. The system of claim 15, wherein the instructions, when executed further enable the system to:

receive, at each resource for a subset of the resources, a set of listings that includes portions of the data to be processed;

analyze the set of listings to determine an unaccounted for portion of the data, the unaccounted for portion associated an offline resource;

access a data store to remove a key value entry that associates the offline resource and the unaccounted for portion data; and send the unaccounted for portion of the data to at least one other resource for processing.

20. The system of claim 19, wherein the set resources includes at least one of a network switch or a host machine.

\* \* \* \* \*